(12) United States Patent
Stevens et al.

(10) Patent No.: US 10,177,368 B2
(45) Date of Patent: Jan. 8, 2019

(54) ANODE COMPARTMENT WITH A COLLECTOR MADE OF AMORPHOUS-ALLOY

(71) Applicants: ELECTRICITE DE FRANCE, Paris (FR); CENTRE NATIONAL DE LA RECHERCHE SCIENTIFIQUE—CNRS-, Paris (FR)

(72) Inventors: Philippe Stevens, Noisy Rudignon (FR); Gwenaelle Toussaint, Nemours (FR); Laurent Puech, Montegut-Lauragais (FR); Philippe Vinatier, Bordeaux (FR)

(73) Assignees: ELECTRICITE DE FRANCE, Paris (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 254 days.

(21) Appl. No.: 15/105,392

(22) PCT Filed: Dec. 17, 2014

(86) PCT No.: PCT/FR2014/053380
§ 371 (c)(1),
(2) Date: Jun. 16, 2016

(87) PCT Pub. No.: WO2015/092267
PCT Pub. Date: Jun. 25, 2015

(65) Prior Publication Data
US 2017/0005324 A1  Jan. 5, 2017

(30) Foreign Application Priority Data
Dec. 18, 2013 (FR) .................................. 13 62919

(51) Int. Cl.
*H01M 4/13* (2010.01)
*H01M 10/05* (2010.01)
(Continued)

(52) U.S. Cl.
CPC .............. *H01M 4/134* (2013.01); *C25D 3/42* (2013.01); *C25D 7/00* (2013.01); *H01M 4/0452* (2013.01);
(Continued)

(58) Field of Classification Search
None
See application file for complete search history.

(56) References Cited

U.S. PATENT DOCUMENTS 5,053,297 A   10/1991  Yamahira et al.
6,485,622 B1  11/2002  Fu
(Continued)

FOREIGN PATENT DOCUMENTS

EP   1 088 796 A1   4/2001
FR   2 950 737 A1   4/2011
(Continued)

OTHER PUBLICATIONS

JP 2001-250559 A English machine translation (Year: 2001).*
(Continued)

*Primary Examiner* — Scott J. Chmielecki
(74) *Attorney, Agent, or Firm* — Drinker Biddle & Reath LLP

(57) ABSTRACT

An anode compartment for rechargeable lithium or sodium batteries, including: a solid electrolyte; a collector deposited on the solid electrolyte; and an active material made of lithium metal or sodium metal which has been grown between the solid electrolyte and the collector in order to form an electrode made of lithium metal or sodium metal with the collector, in which the collector is made of an
(Continued)

amorphous alloy. A method for manufacturing such an anode compartment and a battery including said anode compartment is also presented.

11 Claims, 3 Drawing Sheets

(51) Int. Cl.

| | |
|---|---|
| H01M 4/134 | (2010.01) |
| H01M 4/38 | (2006.01) |
| H01M 4/66 | (2006.01) |
| H01M 4/76 | (2006.01) |
| H01M 10/052 | (2010.01) |
| H01M 10/054 | (2010.01) |
| H01M 10/0562 | (2010.01) |
| H01M 12/08 | (2006.01) |
| C25D 3/42 | (2006.01) |
| C25D 7/00 | (2006.01) |
| H01M 4/04 | (2006.01) |
| H01M 4/1395 | (2010.01) |
| H01M 10/0525 | (2010.01) |
| H01M 4/58 | (2010.01) |
| H01M 4/02 | (2006.01) |

(52) U.S. Cl.
CPC ......... *H01M 4/1395* (2013.01); *H01M 4/381* (2013.01); *H01M 4/382* (2013.01); *H01M 4/662* (2013.01); *H01M 4/76* (2013.01); *H01M 10/052* (2013.01); *H01M 10/054* (2013.01); *H01M 10/0525* (2013.01); *H01M 10/0562* (2013.01); *H01M 12/08* (2013.01); *H01M 4/5815* (2013.01); *H01M 2004/027* (2013.01); *H01M 2300/0068* (2013.01); *Y02E 60/128* (2013.01)

(56) References Cited

U.S. PATENT DOCUMENTS

| | | | |
|---|---|---|---|
| 8,741,487 B1 * | 6/2014 | Duggan | H01M 4/72 |
| | | | 29/2 |
| 2012/0183880 A1 | 7/2012 | Toussaint et al. | |
| 2013/0185930 A1 | 7/2013 | Teeters et al. | |
| 2014/0099541 A1 * | 4/2014 | Hayashi | H01M 4/5825 |
| | | | 429/211 |
| 2015/0155547 A1 * | 6/2015 | Tenzer | H01M 4/0471 |
| | | | 429/221 |

FOREIGN PATENT DOCUMENTS

| | | | |
|---|---|---|---|
| JP | 2000-294291 A | | 10/2000 |
| JP | 2001-250559 A | | 9/2001 |
| JP | 2001250559 A | * | 9/2001 |
| JP | 2005-209434 A | | 8/2005 |
| WO | 2010/128242 A1 | | 11/2010 |

OTHER PUBLICATIONS

Pavuna, On the magnitude of the electrical resistivity of liquid and glassy transition metal alloys</i>, Journal of Non-Crystalline Solids vols. 61-62, Part 2, Jan. 1984, pp. 1353-1358 (Year: 1984).*

Chun et al., "An Investigation of a Possible Thin Film RF Sputter Deposited Sodium-ion conductor: NaPON," Proc. 14th Meeting Electrochem. Soc., 2008, Abstract #195, 1 page.

Gasmi et al., "Comparison of Different Synthesis Methods for Nasicon Ceramics," Journal of Sol-Gel Science and Technology, 1995, vol. 4(3), pp. 231-237.

Yu et al., "A Stable Thin-Film Lithium Electrolyte: Lithium Phosphorus Oxynitride," J. Electrochem. Soc., 1997, vol. 144 (2), pp. 524-532.

Office Action issued in related application JP 2016-541437, dated Jun. 12, 2017, with English language translation, 11 pages.

Hallinan et al., "Lithium Metal Stability in Batteries with Block Copolymer Electrolytes," Journal of the Electrochemical Society, vol. 160 (3), 2013, pp. A464-A470.

Murugan et a., "Fast Lithium Ion Conduction in Garnet-Type $Li_7La_3Zr_2O_{12}$," Angew. Chem. Int. Ed., vol. 46, 2007, pp. 7778-7781.

Thokchom et al., "The effects of crystallization parameters on ionic conductivity of a lithium aluminum germanium phosphate glass-ceramics," Journal of Power Sources, vol. 195, 2010, pp. 2870-2876.

* cited by examiner

ANODE COMPARTMENT WITH A COLLECTOR MADE OF AMORPHOUS-ALLOY

CROSS-REFERENCE TO RELATED APPLICATIONS

This application is the U.S. national phase of the International Patent Application No. PCT/FR2014/053380 filed Dec. 17, 2014, which claims the benefit of French Application No. 13 62919 filed Dec. 18, 2013, the entire content of which is incorporated herein by reference.

FIELD

The present invention relates to the technical field of rechargeable lithium and sodium batteries and more particularly an anode compartment for such batteries as well as the processes for their manufacture.

BACKGROUND

The relatively low mass energy density is today the main limitation to the use of rechargeable lithium or sodium batteries in portable equipment such as portable electronic equipment or electric vehicles. This is largely linked to the performances of the materials which compose the batteries. Currently, the available materials for negative electrodes have a specific capacity comprised between 300 and 350 Ah/kg. The higher the specific capacity of a material, the more the mass energy density can be increased.

As lithium metal has a theoretical specific capacity greater than 3800 Ah/kg, its use as a material for negative electrodes appears promising.

Unfortunately, this material used as active material in a negative electrode has an undesirable tendency to grow in the form of dendrites during charging phases. In growing, these dendrites pass through the liquid electrolyte and can consequently cause a short-circuit by electrically connecting the positive electrode to the negative electrode.

In order to avoid the growth of the lithium metal in the form of dendrites during charging phases, lithium-ion batteries use a negative electrode material into which the lithium ion can be introduced during the charging phase and from which it can be released during the discharging phase. Graphite is an example of this. An illustration of the use of graphite as negative electrode material is given in document U.S. Pat. No. 5,053,297.

Nevertheless, graphite has the drawback of having a specific capacity which is much lower (theoretically 376 Ah/kg in the case of $LiC_6$ for example) than that of lithium metal.

Alternatively, the lithium metal can be used in combination with a polymer electrolyte composed of a neutral matrix such as polyethylene oxide (also referred to as PEO) in which a lithium salt such as lithium bis(trifluoromethanesulphonyl)imide (also referred to as LiTFSI) is dissolved. This is the case with lithium-metal-polymer batteries (LMP batteries). In order to limit the risk of growth of the lithium metal in the form of dendrites, the thickness of the lithium metal is limited, generally between 30 and 100 μm, in the negative electrodes of LMP batteries. Thus, the lithium metal is laminated in the form of a ribbon on a polymer electrolyte film in order to obtain an anode compartment the useful charge density per unit of surface area of which is relatively low, typically between 1 and 10 mAh/cm².

Moreover, in such a polymer electrolyte, the ionic conductivity of the electrolyte is obtained by the addition of LiTFSI salt. The mobility of this salt, in particular the anion, in the neutral matrix generates a salt concentration gradient during the passing of an ionic current, in fact, the transport number (i.e. the fraction of the current transported by the ion) for the cation is less than 1. This concentration gradient is higher the stronger the current density is. Now, the formation of lithium metal in the form of dendrites is promoted by steep concentration gradients.

A final solution for avoiding the growth of lithium metal in the form of dendrite which is described here is the use of a very hard solid electrolyte. The high hardness of these solid electrolytes has the advantage of preventing the dendrites formed from passing through the solid electrolyte and generating a short-circuit. In the article "*Lithium metal stability in batteries with block copolymer electrolytes*", D. Hallinan et al. have calculated that a polymer electrolyte with a hardness of approximately 6 GPa is necessary in order to avoid the formation of dendrites (*Journal of the Electrochemical Society*, 160 (3) A464-A470 (2013).

Ceramic materials such as Lisicon ("Li super ionic conductor") or Nasicon ("Na super ionic Conductor"), which can be used as solid electrolytes, have a hardness of approximately 6 GPa. Moreover, these ceramic materials do not depend on any salt dissolved in their matrix in order to have ion conduction properties as they are intrinsically conductors of ions: the ionic conduction is obtained only by cation transport through the crystalline structure of these ceramic materials and the conduction of electrons is negligible. As a result, their transport number is equal to 1, which discourages even more the growth of lithium metal in the form of dendrites.

The use of a ceramic electrolyte therefore opens the way for the use of a negative electrode with much greater thickness as the problem of the formation of dendrites does not arise. Thus, a negative electrode with a much higher surface area capacity can be obtained. The combination of a negative electrode with a very high surface area capacity with a positive electrode with very high capacity such as an air electrode (using oxygen in the air) or a sulphur electrode can therefore lead to a battery with a very high mass and volume energy density being obtained. In such a battery, metal, for example steel, is deposited on the ceramic electrolyte, for example by cathodic sputtering, in a thin layer in order to form a current collector. Later, the lithium metal is grown between the collector and the ceramic electrolyte.

In such a battery with a very high mass and volume energy density, the reduction of the cations during the charging phase occurs at the interface between the ceramic electrolyte and the active material that is the lithium metal. Thus, the growth of the lithium metal occurs from this interface in a single dimension.

Nevertheless, the lithium metal can grow in the form of a dense and uniform layer (see FIG. 7) or in the form of a stringy or porous deposition (see FIG. 6). The inventors have observed that a negative electrode made of lithium metal in a stringy or porous form has a resistance which increases rapidly with the number of charging and discharging cycles in comparison to a negative electrode made of lithium metal in a dense and uniform form.

They attribute this increase to a reduction in the active surface of the negative electrode which is determined by the interface between the lithium metal and the solid electrolyte. The reduction in this surface leads to a reduction in the capacity of the negative electrode and an increase in the resistance of the latter. When the layer of lithium created during the charging phase is dense and uniform, there is no increase in the resistance of the negative electrode and the latter can be used for a higher number of charging and discharging cycles.

Moreover, the inventors have observed that the growth of lithium in a stringy or porous form (not very dense form) reduced the capacity of the negative electrode by rendering a part of the lithium metal inaccessible during the discharging phase: this part of the lithium metal is not oxidized. For example, the inventors have analyzed a totally discharged negative electrode and have observed that 30% of the lithium metal formed during the charging phase was not accessible during the discharging phase and was present in the stringy or porous form. This is due to the fact that the lithium metal is no longer in effective contact with the solid electrolyte and can therefore not be oxidized to the Li+ cation during the discharging phase at the level of the interface. On this same negative electrode, all the parts which were present in the dense and uniform form with a good interface with the solid electrolyte were accessible during the discharging phase and could be totally consumed.

In researching a solution to this problem, the inventors have discovered that the use of an amorphous metal in order to form the current collector avoids the formation of not very dense lithium and only dense lithium is produced. The present invention is based on this discovery.

SUMMARY

As a result, the present invention proposes a solution to remedy the problems encountered in the prior art described above.

To this end, the present invention proposes an anode compartment for rechargeable lithium or sodium batteries comprising:
  a solid electrolyte;
  a collector deposited on the solid electrolyte; and
  an active material made of lithium metal or sodium metal that is grown between the solid electrolyte and the collector in order to form with the collector an electrode made of lithium metal or sodium metal,
  in which the collector is made of an amorphous alloy.

In such an anode compartment, the active material made of lithium metal or sodium metal grows in the dense form. Thus, the negative electrode formed by the collector and by the active material has a high specific capacity between 10 and 500 mAh/cm$^2$.

Other optional and non-limitative features are as follows.

The amorphous alloy preferably has a maximum relative coefficient of elongation greater than 1.8%. The amorphous alloy advantageously contains less than 10% by number of Si, Sn or Ag atoms in total. The amorphous alloy is preferentially $Cu_xZr_{1-x}$, with x comprised between 0.25 and 0.75.

The collector can be in the form of a fine layer with a thickness of less than 1 μm.

The solid electrolyte is advantageously made of a ceramic material.

The present invention also proposes a process for the manufacture of an anode compartment for rechargeable lithium batteries comprising:
  a solid electrolyte;
  a collector made of amorphous-alloy; and
  an active material made of lithium metal or sodium metal between the solid electrolyte and the collector;
  the process comprising the steps of:
  deposition of an amorphous alloy on the solid electrolyte in order to form the collector;
  growth of an active material made of lithium metal or sodium metal between the solid electrolyte and the collector thus obtaining the anode compartment.

The amorphous alloy can be deposited on the solid electrolyte by cathodic sputtering or ion beam sputtering.

The amorphous alloy is preferentially $Cu_xZr_{1-x}$, with x comprised between 0.25 and 0.75.

The active material is advantageously grown between the solid electrolyte and the collector by electrochemical deposition.

The solid electrolyte is advantageously made of a ceramic material.

The invention also proposes a battery comprising an anode compartment as described above and a cathode.

BRIEF DESCRIPTION OF THE DRAWINGS

Other objectives, features and advantages will become apparent on reading the illustrative description which follows, with reference to the drawings which are given by way of example and are non-limitative, in which.

DETAILED DESCRIPTION

With reference to FIGS. 1 to 4, an anode compartment for rechargeable lithium or sodium batteries according to the invention is described hereafter.

This anode compartment 1 comprises a solid electrolyte 2, a collector 3 on the solid electrolyte 2, and an active material 4 made of lithium metal or sodium metal between the solid electrolyte 2 and the collector 3. The active material 4 results from the growth of lithium metal or sodium metal between these two components and forms with the collector 3 an electrode made of lithium metal or sodium metal.

The anode compartment 1 is novel in that the collector 3 is made of an amorphous alloy. In fact, as already indicated above, the inventors discovered that such a collector allowed the growth of active material in a not very dense form.

Figure 6:
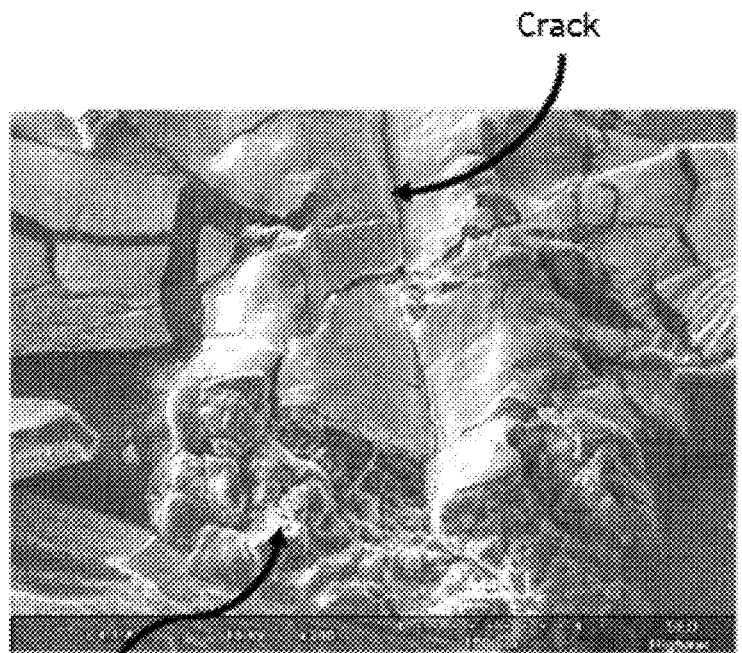
FIG. 6 is a photograph showing the state of the surface of a collector made of steel after a charging phase.
Figure 7:
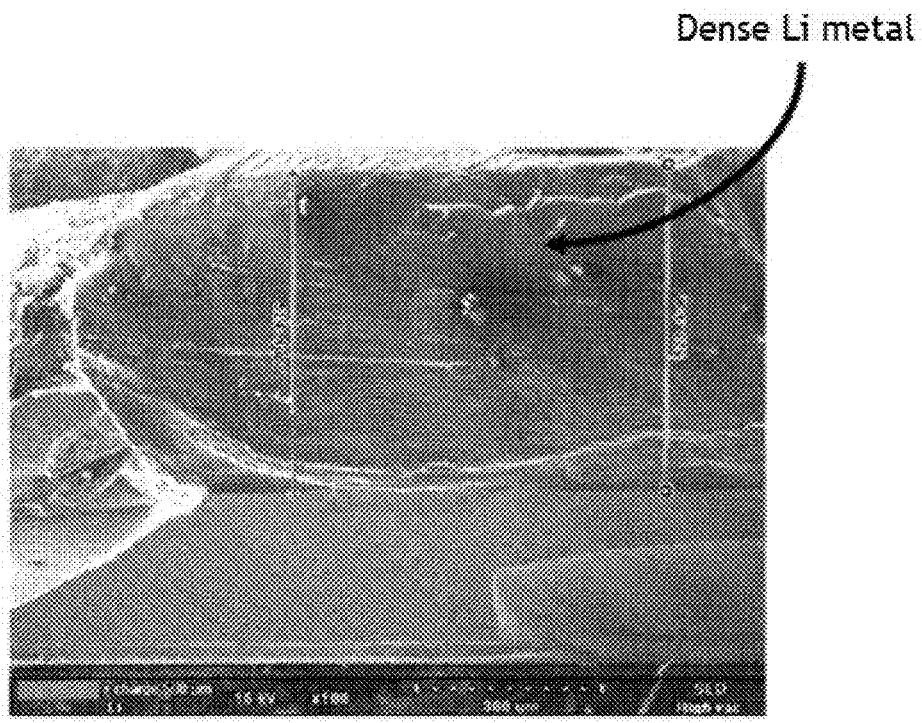
FIG. 7 is a photograph showing the appearance of an active material made of dense lithium metal.

Later, the inventors wished to identify the cause of this growth in a not very dense form of the active material in the collectors of the prior art. It is in this way that the inventors observed that this growth of the lithium metal in a not very dense form occurred particularly where the collector, generally made of steel, is deposited on the solid electrolyte, and under which the lithium metal grows, exhibits cracks (see FIG. 6).

The inventors assume that this growth in a not very dense form is due to the fact that in these areas of cracks, the lithium metal is not subject to constraints and therefore has a tendency to form in a more uncontrolled manner.

In order to explain the appearance of cracks, the inventors propose the hypothesis according to which, during the growth of the lithium metal between the collector and the solid electrolyte, a tension is created at the surface of the collector orientated collinearly to the latter and leads to its rupture.

An amorphous alloy, as opposed to a crystalline alloy, has an arrangement of atoms constituting it which is irregular over an average and large distance. The collector 3 made of amorphous alloy of the invention does not crack during the charging phase of a battery comprising the anode compartment, which allows the growth of the active material in a not very dense form (stringy or porous) to be avoided. It is capable of deforming in a reversible manner (elastic deformation) in the case of significant stresses compressing the active material. In fact, the maximum relative coefficient of elongation ($\varepsilon_y$) of an amorphous alloy, equal to the stress ($\sigma_y$) divided by Young's modulus (E), is higher than that of a crystalline metal or alloy.

The amorphous alloy chosen advantageously has a maximum relative coefficient of elongation ($\varepsilon_y$) greater than 1.8%.

The amorphous alloy is preferably composed of metals not forming an alloy with lithium metal during an electrochemical deposition of lithium metal from the collector 3 made of such an alloy. Thus, the amorphous alloy preferably contains in total less than 10% by number of silicon, tin and silver atoms.

Advantageously, the amorphous alloy is $Cu_xZr_{1-x}$, with x comprised between 0.25 and 0.75, preferably, x is equal to approximately 0.4.

The collector 3 is in the form of a fine layer, preferably with a thickness of less than 1 μm. Thus, the collector 3 is flexible.

The collector 3 is electrically connected to a flexible electronic conductor formed by a flexible metallic grid or film, preferably a flexible grid made of steel. This flexible metallic grid covers at least part, preferably all, of the surface of the current collector. In order to improve the electrical contact between the current collector and the electronic conductor, a silver lacquer is preferably applied to their contact area. The electronic conductor makes it possible to electrically connect the collector 3 to an element external to the anode compartment.

The solid electrolyte 2 is made of a ceramic material conducting alkali metal cations, for example lithium or sodium, preferably lithium.

Such lithium conducting ceramic materials are known, for example LIC-GC (for Lithium Ion Conducting Glass Ceramic from the company Ohara Inc. Japan). They are for example ceramics of formula $Li_{1-x}(M,Ga,Al)_x(Ge_{1-y}Ti_y)_{2-x}(PO_4)_3$ where M represents one or more metals chosen from Nd, Sm, Eu, Gd, Tb, Dy, Ho, Er, Tm and Yb, and where $0<x\leq0.8$ and $0\leq y\leq1.0$. Other materials of this type are also known in the literature, such as LATP of formula $Li_{1-x}Ti_{2-x}(PO_4)_3$ and described in the article "The effects of crystallization parameters on ionic conductivity of a lithium aluminium germanium phosphate glass-ceramics" by J. S. Thokchom, and B. Kumar, in J. Power Sources, vol. 195, p. 2870, 2010, or LLZ of formula $Li_7La_3Zr_2O_{12}$ and described in the article "Fast Lithium Ion Conduction in Garnet-Type $Li_7La_3Zr_2O_{12}$" by R. Murugan, V. Thangadurai, and W. Weppner, in Angew. Chem. Int. Ed., 46 (2007), p. 7778.

Sodium conducting ceramic materials are for example materials of formula $Na_{1-x}Zr_2Si_xP_{3-x}O_{12}$ where $0\leq x\leq3$. They are described in particular in U.S. Pat. No. 6,485,622 and in the article "Comparison of Different Synthesis Methods for Nasicon Ceramics" by N. Gasmi et al., J. from Sol-Gel Science and Technology 4(3) (1995) p. 231-237, and known in the literature under the name Nasicon.

The solid electrolyte 2 is preferably in the form of a membrane. Its thickness depends on its two other dimensions. The greater the surface of the membrane the greater the thickness must be in order to resist mechanical stresses. Moreover, the electrical efficiency of a battery is partially governed by the specific resistance of the electrolyte, and this specific resistance R is expressed by the formula:

$$R=(r\cdot e)/A,$$

where r denotes the resistivity of the electrolyte, e the thickness of the membrane and A its surface area. Thus, it is generally sought to use, where possible, thin solid electrolytes. The thickness of the membrane is advantageously comprised between 30 μm and 500 μm, preferably between 50 μm and 160 μm. These thicknesses are adequate for surface areas which are greater than 1 $mm^2$, preferably comprised between 1 $mm^2$ and 400 $cm^2$, yet more preferably between 4 $cm^2$ and 100 $cm^2$.

The ceramic electrolyte 2 can be coated on at least one of its surfaces from which the active material will grow, in particular when this is made of lithium metal. As examples of coatings 5 based on $Li_3N$, $Li_3P$, LiI, LiBr, LiF or lithium phosphorus oxynitride (LiPON) (see for example X. Yu et al., J. Electrochem. Soc. (1997) 144(2), page 524) can be mentioned for the conduction of lithium, and for example borosilicate glass with the addition of $Na_2O$ or sodium phosphorus oxynitride (NaPON) (see for example S. Chun et al., Proc. 124th Meeting Electrochem. Soc. (2008) 195) can be mentioned for the conduction of sodium.

The active material 4 advantageously has a maximum thickness comprised between 50 μm and 5 mm, preferably between 100 μm and 500 μm, at the end of the charging phase.

The anode compartment 1 can comprise a sealed and rigid case 6 in which the solid electrolyte 2, the collector 3 and the active material 2 are found. The surface of the solid electrolyte 2 opposite to that turned towards the collector 3 at least partially forms an external surface of the case 6. The case 6 can have any appropriate shape allowing incorporation in a battery, for example a cylindrical or parallelepipedal shape. Thus, the case 6 and the solid electrolyte 2 delimit a sealed internal space. The case 6 can be produced of synthetic resin, preferably of a thermosetting or cold-setting resin. The chemical nature of this resin is not critical, provided that it does not adversely interact with the components contained inside the anode compartment 1 and the elements of the battery in which the anode compartment 1 is used. For example, epoxide, unsaturated polyester, phenolic and polyimide resins are suitable.

In this case, and advantageously, the collector 3 covers virtually all the surface of the solid electrolyte 2 but not entirely, in particular in order to avoid it coming into contact with the walls of the sealed case 6. In fact, if the active material has a relatively large thickness at the end of the charging phase, and if the collector 3 is in contact with the internal walls of the case 6, the collector 3 risks deforming and/or breaking as it moves away from the solid electrolyte 2 when the active material 4 grows during the charging phase. The extent of the collector 3 on the solid electrolyte 2 is chosen so that the distance between the edges of the collector 3 and the walls of the case 6 is preferably at the most equal to a few hundreds of microns.

Still in this case, the anode compartment 1 can then also comprise a resilient element acting on the collector 3 so that this is forced in the direction of the solid electrolyte 2 thus allowing the continuous compression of the active material 4. The resilient element can be one or more of the walls of the case 6 itself or a block 7 made of resilient material such as a foam. In the second case, the block made of resilient material occupies all of the space left free in the cassette when the active material is completely consumed, i.e. at the end of the discharging phase.

The block 7 made of resilient material is for example made of poly(chloroprene) foams (also called Neoprene®), preferably the neoprene foams marketed under the name Bulatex®, in particular Bulatex C166, by the Hutchinson company. Another example would be the product Sylomer® G, a poly(ether urethane) foam marketed by the Plastiform company.

A battery comprising the anode compartment described above is described hereafter.

This battery comprises, in addition to the anode compartment, a positive electrode, optionally a liquid electrolyte.

The positive electrode can be for example an air electrode or an electrode using sulphur.

When the positive electrode is an air electrode, it is preferably made of a porous material that conducts electrons. This porous material is for example a compound of carbon black, a catalyst based on manganese or cobalt oxide, a hydrophobic binder such as HFP (hexafluoropropylene) or PTFE (polytetrafluoroethylene), and a current collector such as a collector in the form of a nickel grid. An anion-conducing polymer can be added into the electrode as described in patent WO 2010/128242 A1, in particular when the electrolyte is aqueous. This polymer has the function of preventing the carbonation of the aqueous electrolyte by the $CO_2$ contained in the air. The hydrophobic binder has the double function of producing a mechanically integrated porous structure from a powder the electronic percolation of which is ensured by contact between the carbon grains, and being sufficiently hydrophobic in order to prevent the electrolyte from passing through the electrode when this is liquid.

Figure 1:
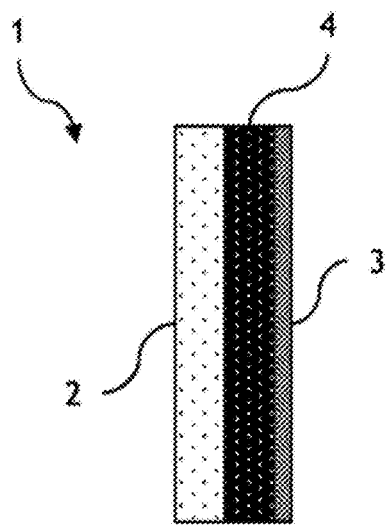
FIG. 1 is a diagrammatic illustration of an anode compartment according to the invention without a coating.
Figure 2:
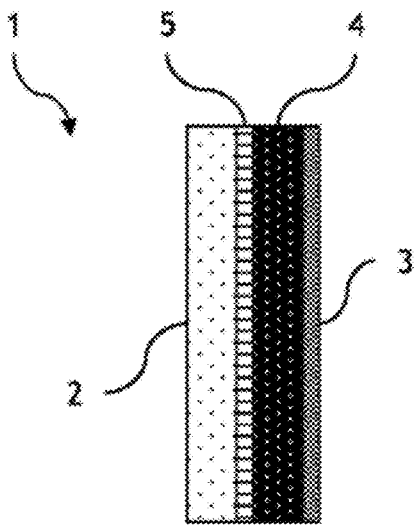
FIG. 2 is a diagrammatic illustration of an anode compartment according to the invention with a coating.
Figure 3:
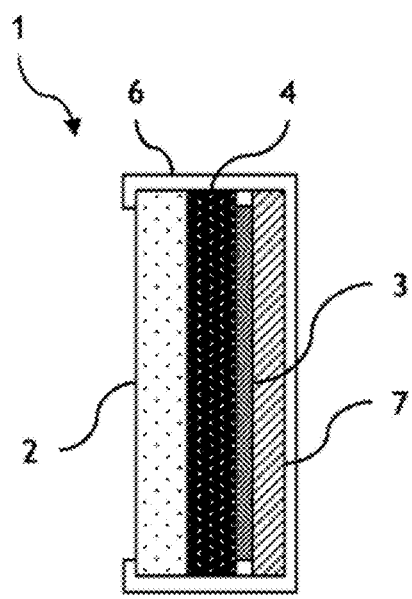
FIG. 3 is a diagrammatic illustration of an anode compartment according to the invention without a coating and comprising a case.
Figure 4:
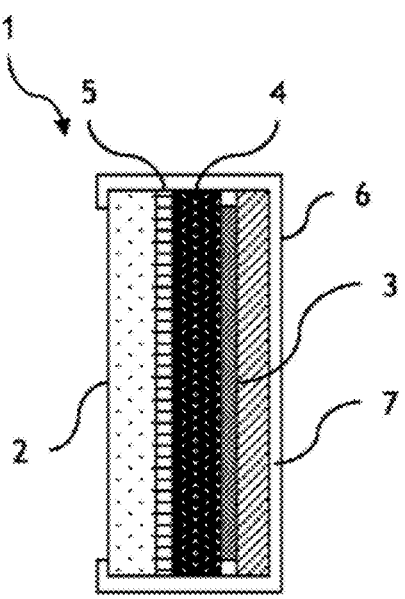
FIG. 4 is a diagrammatic illustration of an anode compartment according to the invention with a coating and comprising a case.
Figure 5:
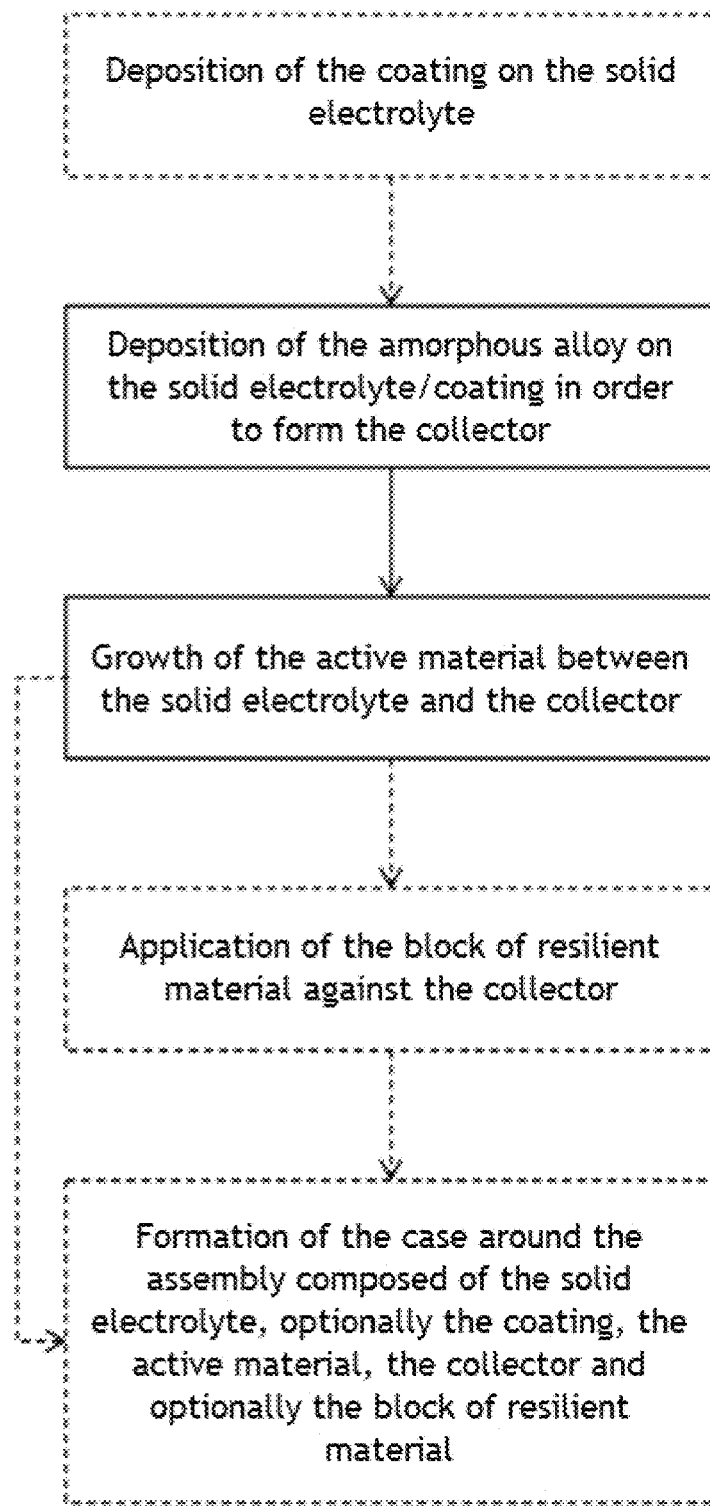
FIG. 5 is a diagram schematically illustrating the different steps of the process for the manufacture of an anode compartment according to the invention, the optional steps being indicated in dotted lines.

This battery is for example a lithium-air or sodium-air battery or also a lithium-sulphur battery, or any battery using an anode made of lithium metal or sodium metal With reference to FIG. 5 a process for the manufacture of an anode compartment as presented above is described hereafter.

This process comprises the deposition of an amorphous alloy on the solid electrolyte in order to form the collector and the growth of an active material made of lithium metal or sodium metal between the solid electrolyte and the collector thus obtaining the anode compartment.

The amorphous alloy can be deposited on the solid electrolyte by cathodic sputtering or by ion beam sputtering.

In the case of cathodic sputtering, the material of the target used can be directly the alloy that is desired to be deposited on the solid electrolyte, the material can be crystalline or already amorphous. As a variant several targets can be used and the maximum number of which is the number of metallic elements composing the amorphous alloy that is desired to be deposited on the solid electrolyte. In the case where the number of targets is lower than the number of metallic elements composing the amorphous alloy, at least one of the targets is made of an alloy. The definition of metallic element is understood as including all the transition chemical elements as well as steel. For example, the material of the target is made of an amorphous or crystalline alloy of CuZr. By way of another example, two targets are used, one made of Cu and the other of Zr.

The amorphous alloy is deposited on the solid electrolyte until a thickness of less than 2 µm is reached, preferably comprised between 200 and 400 nm.

The growth of the active material between the solid electrolyte and the collector can be produced as follows. The face of the solid electrolyte which is not turned towards the collector is placed in contact, at least partially, with a liquid electrolyte containing the cations of the alkali metal which will form the active material. A reduction potential is then applied between the collector and a positive electrode immersed in the liquid electrolyte containing the cations of the alkali metal. The reduction potential is maintained between the collector and the positive electrode for a sufficient duration for the active material to cross between the solid electrolyte and the collector up to a desired thickness.

The liquid electrolyte can be for example LiOH in the case of an active material made of lithium metal, or NaOH in the case of an active material made of sodium metal. The concentration of LiOH or NaOH is preferably at least equal to 1 mol/L and can range up to saturation or even beyond.

The positive electrode used for the growth of lithium metal or sodium metal can be an electrode made of metal or alloy that is stable in the liquid electrolyte used and at the oxidation potentials of the ions of the liquid electrolyte.

The reduction potential applied is maintained preferably at a value comprised between −3.1 V and −3.6 V with respect to a reference electrode Hg/HgO/KOH 1M in the liquid electrolyte. This potential must in fact be sufficiently high in absolute value for the alkali ion to be reduced to alkali metal. Preferably, the current strength is comprised between 0.1 mAh/cm² and 100 mAh/cm².

In the case where a coating is provided on the solid electrolyte, this is deposited on the solid electrolyte before the deposition of the amorphous alloy by cathodic sputtering for example.

In the case where the anode compartment is in the form of a case, the case is poured around the assembly constituted by the solid electrolyte, optionally the coating, the active material, the collector and optionally the block made of resilient material.

The invention claimed is:

1. A lithium or sodium rechargeable battery anode compartment comprising:
   a solid electrolyte;
   a current-collector deposited on the solid electrolyte; and
   an active material made of lithium metal or sodium metal that has been grown between the solid electrolyte and the current-collector, thus forming with the current-collector an electrode made of lithium metal or sodium metal,
   wherein the current-collector is made of an amorphous alloy, and
   wherein the amorphous alloy has a maximum relative coefficient of elongation of greater than 1.8%.

2. The lithium or sodium rechargeable battery anode compartment according to claim 1, wherein the amorphous alloy contains in total less than 10% by number of Si, Sn and Ag atoms.

3. The lithium or sodium rechargeable battery anode compartment according to claim 1, wherein the amorphous alloy is $Cu_xZr_{1-x}$, with x comprised between 0.25 and 0.75.

4. The lithium or sodium rechargeable battery anode compartment according to claim 1, wherein the current-collector is in the form of a layer with a thickness of less than 1 µm.

5. The lithium or sodium rechargeable battery anode compartment according to claim 1, wherein the solid electrolyte is made of a ceramic material.

6. A method to manufacture a lithium or sodium rechargeable battery anode compartment comprising:
- a solid electrolyte;
- a current-collector made of amorphous-alloy; and
- an active material made of lithium metal or sodium metal between the solid electrolyte and the current-collector;

the method comprising the steps of:
- deposition of an amorphous alloy on the solid electrolyte, thus forming the current-collector, the amorphous alloy having a maximum relative coefficient of elongation of greater than 1.8%;
- growing an active material made of lithium metal or sodium metal between the solid electrolyte and the current-collector; and
- obtaining the lithium or sodium rechargeable battery anode compartment.

7. The method according to claim 6, wherein the amorphous alloy is deposited on the solid electrolyte by cathodic sputtering or ion beam sputtering.

8. The method according to claim 6, wherein the amorphous alloy is $Cu_xZr_{1-x}$, with x comprised between 0.25 and 0.75.

9. The method according to claim 6, wherein the active material is grown between the solid electrolyte and the current-collector by electrochemical deposition.

10. The method according to claim 6, wherein the solid electrolyte is made of a ceramic material.

11. A battery comprising:
- a cathode,
- a liquid electrolyte and
- a lithium or sodium rechargeable battery anode compartment according to claim 1.

* * * * *